(12) United States Patent
Nap

(10) Patent No.: US 12,030,001 B2
(45) Date of Patent: Jul. 9, 2024

(54) PORTABLE MODULAR FILTER SYSTEM

(71) Applicant: Kyle Nap, Frisco, TX (US)

(72) Inventor: Kyle Nap, Frisco, TX (US)

( * ) Notice: Subject to any disclaimer, the term of this patent is extended or adjusted under 35 U.S.C. 154(b) by 0 days.

(21) Appl. No.: 17/102,375

(22) Filed: Nov. 23, 2020

(65) Prior Publication Data

US 2021/0069615 A1    Mar. 11, 2021

Related U.S. Application Data

(63) Continuation of application No. PCT/US2019/033437, filed on May 22, 2019.

(60) Provisional application No. 62/830,866, filed on Apr. 8, 2019, provisional application No. 62/675,843, filed on May 24, 2018.

(51) Int. Cl.
*B01D 24/00* (2006.01)
*B01D 21/26* (2006.01)
*B01D 24/10* (2006.01)
*B01D 35/147* (2006.01)
*B01D 35/30* (2006.01)
*B01D 36/04* (2006.01)
*C02F 1/00* (2023.01)
*C02F 1/38* (2023.01)

(52) U.S. Cl.
CPC ......... *B01D 24/002* (2013.01); *B01D 21/265* (2013.01); *B01D 24/105* (2013.01); *B01D 35/1475* (2013.01); *B01D 35/303* (2013.01); *B01D 36/045* (2013.01); *C02F 1/004* (2013.01); *C02F 1/38* (2013.01); *B01D 2101/02* (2013.01); *B01D 2101/04* (2013.01); *B01D 2201/54* (2013.01); *C02F 2201/007* (2013.01); *C02F 2201/008* (2013.01); *C02F 2209/005* (2013.01)

(58) Field of Classification Search
CPC B01D 24/002; B01D 24/105; B01D 35/1475; B01D 21/265; B01D 35/303; B01D 36/045; B01D 2101/02; B01D 2101/04; B01D 2201/54; C02F 1/38; C02F 1/004; C02F 2201/008; C02F 2209/005; C02F 2201/007
See application file for complete search history.

(56) References Cited

U.S. PATENT DOCUMENTS

| 911,314 A | 2/1909 | Maranville |
| 2,585,878 A | 2/1952 | Tryon |
| 2,759,607 A | 8/1956 | Boyd et al. |
| 2,782,929 A | 2/1957 | Colket |

(Continued)

FOREIGN PATENT DOCUMENTS

| CA | 2183146 A1 | 2/1998 |
| CN | 207243647 U | 4/2018 |

(Continued)

OTHER PUBLICATIONS

The Water Treatments, Water Filter, https://www.thewatertreatments.com/water-treatment-filtration/pressure-filter-water-filtration/, 2015 (Year: 2015).*

(Continued)

*Primary Examiner* — Bradley R Spies
*Assistant Examiner* — Jeannie McDermott
(74) *Attorney, Agent, or Firm* — Conley Rose, P.C.; J. Robert Brown, Jr.

(57) ABSTRACT

The present invention provides a portable high throughput liquid filter system.

19 Claims, 17 Drawing Sheets

(56) References Cited

U.S. PATENT DOCUMENTS

| | | | |
|---|---|---|---|
| 3,474,910 A * | 10/1969 | Mendelow | B01D 24/14 210/288 |
| RE28,458 E * | 7/1975 | Ross | B01D 24/4631 210/792 |
| 3,910,500 A * | 10/1975 | Hardison | B01D 24/12 210/275 |
| 4,111,805 A | 9/1978 | Van Pool et al. | |
| 4,139,473 A * | 2/1979 | Alldredge | B01D 24/165 210/279 |
| 4,246,119 A * | 1/1981 | Alldredge | B01D 24/008 210/279 |
| 4,282,256 A | 8/1981 | Evich et al. | |
| 4,336,141 A | 6/1982 | Santora | |
| D296,352 S | 6/1988 | Luzenberg | |
| 5,244,579 A | 9/1993 | Horner | |
| 5,547,584 A | 8/1996 | Capehart | |
| 5,895,576 A | 4/1999 | Yamasaki et al. | |
| 6,344,146 B1 | 2/2002 | Moorehead et al. | |
| 6,383,389 B1 | 5/2002 | Pilgram et al. | |
| 6,921,478 B2 | 7/2005 | Lambert | |
| 6,936,176 B1 | 8/2005 | Greene, III et al. | |
| 7,510,661 B2 | 3/2009 | Hills | |
| 8,372,274 B2 | 2/2013 | Early et al. | |
| 8,388,850 B2 | 3/2013 | Delano | |
| 9,180,411 B2 | 11/2015 | Prakash | |
| 9,255,025 B2 | 2/2016 | Smiddy | |
| 9,751,790 B2 | 9/2017 | McCabe et al. | |
| 2003/0038084 A1 | 2/2003 | Mitchell et al. | |
| 2003/0057155 A1 | 3/2003 | Husain et al. | |
| 2003/0121846 A1 | 7/2003 | Use et al. | |
| 2004/0060860 A1 | 4/2004 | Peterson et al. | |
| 2005/0109697 A1 | 5/2005 | Olivier | |
| 2007/0029238 A1 | 2/2007 | Duby | |
| 2007/0029328 A1 | 2/2007 | Duby | |
| 2007/0209999 A1 | 9/2007 | Smith et al. | |
| 2009/0289011 A1 | 11/2009 | Avakian | |
| 2010/0187186 A1 * | 7/2010 | Howdeshell | B01D 21/26 210/744 |
| 2010/0320159 A1 * | 12/2010 | Lee | B01D 24/4631 210/792 |
| 2011/0005999 A1 | 1/2011 | Randal | |
| 2011/0089123 A1 | 4/2011 | Kennedy | |
| 2012/0312755 A1 | 12/2012 | Ryan | |
| 2013/0048548 A1 * | 2/2013 | Dreher | B03D 1/1462 210/198.1 |
| 2013/0081984 A1 * | 4/2013 | Cordua | B01D 24/14 210/142 |
| 2013/0112626 A1 | 5/2013 | Lambert et al. | |
| 2013/0313191 A1 * | 11/2013 | Wolf | C02F 9/00 210/638 |
| 2014/0021137 A1 * | 1/2014 | Smiddy | C02F 9/005 210/663 |
| 2014/0116942 A1 | 5/2014 | Gordon | |
| 2014/0319036 A1 | 10/2014 | Mane et al. | |
| 2015/0083652 A1 | 3/2015 | Hawks | |
| 2015/0151998 A1 * | 6/2015 | Stevenson | C02F 9/00 210/644 |
| 2015/0166382 A1 | 6/2015 | Fitzgerald et al. | |
| 2016/0023934 A1 | 1/2016 | Smith | |
| 2016/0060137 A1 | 3/2016 | Yang | |
| 2016/0115062 A1 | 4/2016 | Krieger | |
| 2016/0176737 A1 * | 6/2016 | Erickson | C02F 9/00 423/580.1 |
| 2016/0194221 A1 | 7/2016 | Randal | |
| 2016/0221842 A1 | 8/2016 | Rau, III | |
| 2017/0001131 A1 * | 1/2017 | Bosisio | B01D 24/40 |
| 2017/0120170 A1 * | 5/2017 | Desmottes | B01D 24/4631 |
| 2018/0099237 A1 * | 4/2018 | Silverwood | B01D 24/008 |
| 2018/0141838 A1 | 5/2018 | Ben-Shalom et al. | |
| 2019/0099704 A1 * | 4/2019 | Amburgey | C02F 1/004 |
| 2019/0292082 A1 | 9/2019 | Nap | |
| 2020/0230522 A1 * | 7/2020 | Johnson | B01D 17/0217 |
| 2020/0230615 A1 * | 7/2020 | Melling | B04B 1/04 |

FOREIGN PATENT DOCUMENTS

| | | |
|---|---|---|
| CN | 207375851 U | 5/2018 |
| JP | 2006000763 A | 1/2006 |
| JP | 5914113 B2 | 5/2016 |
| KR | 20160071505 A | 6/2016 |
| WO | 2018085763 A1 | 5/2018 |

OTHER PUBLICATIONS

Evoquo, Odyssey High Rate Sand Filtration with Top Tank Connections, 2017 (Year: 2017).*

Suez. FitraFast extreme rate compressible media filter, brochure and press release, 2017, https://www.suez.com/en/news/press-releases/suez-announcesseveral-contracts-and-innovative-technologies-in-watertreatment-for-industry accessed Aug. 3, 2021 (Year: 2017).*

PCT International Search Report & Written Opinion of the International Searching Authority; PCT/US17/60151; dated Feb. 26, 2018; 11 pages.

Bolivian Office Action; SP244-2017; dated Dec. 14, 2020; 7 pages.

PCT International Search Report & Written Opinion of the International Searching Authority; PCT/US19/033437; dated Jul. 30, 2019; 9 pages.

Office Action dated Jan. 28, 2022; U.S. Appl. No. 16/347,576, filed May 4, 2019; 25 pages.

Bolivian Office Action; Application No. SP244-2017; dated Jan. 14, 2022; 12 pages.

Colombian Office Action; Application No. NC2020/0016120; dated Jan. 17, 2022; 6 pages.

Argentine Office Action; Application No. 20170103072; dated May 26, 2022; 3 pages.

Saudi Arabian Office Action; Application No. 520420629; dated Apr. 19, 2022; 7 pages.

Argentine Office Action; Application No. 20170103072; dated Oct. 25, 2022; 7 pages.

Final Office Action dated Sep. 2, 2022; U.S. Appl. No. 16/347,576, filed May 4, 2019; 21 pages.

Argentine Office Action; Application No. 20190101372; dated Aug. 11, 2022; 4 pages.

Colombian Office Action; Application No. NC2020/0016120; dated Jul. 21, 2022; 9 pages.

Advisory Action dated Jan. 18, 2023; U.S. Appl. No. 16/347,576, filed May 4, 2019; 12 pages.

Notice of Allowance dated Feb. 10, 2023; U.S. Appl. No. 16/347,576, filed May 4, 2019; 15 pages.

Argentine Office Action; Application No. 20190101372; dated Dec. 29, 2022; 11 pages.

Nap, Kyle; U.S. Appl. No. 18/333,318, filed Jun. 12, 2023; Title: Portable Systems for High Throughput Liquid Purification; 33 pages.

Bolivian Office Action; Application No. SP244-2017; dated Feb. 23, 2023; 9 pages.

Argentine Office Action; Application No. 20190101372; dated Sep. 18, 2023; 3 pages.

* cited by examiner

PORTABLE MODULAR FILTER SYSTEM

CROSS-REFERENCE

This application is a Continuation of International Application Serial Number PCT/US2019/033437, filed May 22, 2019, which claims the benefit of U.S. provisional application No. 62/675,843 filed May 24, 2018, and U.S. provisional application No. 62/830,866, filed Apr. 8, 2019, which applications are incorporated herein by reference.

BACKGROUND

Systems for liquid processing and purification are available in a variety of industries. These systems primarily involve chemical processing and filtering and combinations thereof. In general, for high volume liquid purification, large, fixed, expensive and cumbersome machinery is required to process liquids, such as water at levels sufficient to meet demand.

SUMMARY

In one embodiment, the principles of the present disclosure provide a system and method for high throughput purification of liquids. The system provides portable, high throughput filter systems that may be attached to a variety of purification systems. Once configured the system provides for a system of liquid purification that produces unprecedented quality and volume with unprecedented flexibility.

In some embodiments principles of the present disclosure provide a portable filter system for high throughput purification of liquids comprising a platform comprising first and second filter units, each filter unit being of a width and height and a top and bottom, wherein said width is greater than said height, wherein each of said filter units comprises a first filter media and wherein each of said filters comprises at least one inlet and at least outlet said inlets configured to be connected to a liquid source and said outlets configured to be connected to a discharge manifold and a pressure sustaining pump downstream of said discharge manifold capable of sustaining pressure of at least 20-40 psi. In some embodiments the top of the filter units is tiered with the middle being taller than the sides. This allows for improved backwash results.

It is contemplated that any embodiment of a method or composition described herein can be implemented with respect to any other method or composition described herein.

The use of the word "a" or "an" when used in conjunction with the term "comprising" in the claims and/or the specification may mean "one," but it is also consistent with the meaning of "one or more," "at least one," and "one or more than one."

The use of the term "or" in the claims is used to mean "and/or" unless explicitly indicated to refer to alternatives only or the alternative are mutually exclusive, although the disclosure supports a definition that refers to only alternatives and "and/or."

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

Other objects, features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

DESCRIPTION OF THE DRAWINGS

The following drawings form part of the present specification and are included to further demonstrate certain aspects of the present invention. The invention may be better understood by reference to one or more of these drawings in combination with the detailed description of the specification embodiments presented herein.

DESCRIPTION

As described above, systems have been used for purification of liquids. While any liquid finds use in this invention, in preferred embodiments water purification is performed. In some embodiments water may be contaminated with any of a variety of contaminants including chemicals such as salts or hydrocarbons including oil and gas. In some industries, such as oil drilling and fracking, tremendous volumes of water are required to perform the required tasks and tremendous volumes of waste water purification are produced. Despite the presence of water purification systems, current methods are too slow and inefficient resulting in a bottleneck and considerable expense in the process. Accordingly, there exists a need for improved systems of liquid purification. In addition, having a high throughput filter system that can be configured to a variety of liquid systems is of notable importance. Many liquid filter systems are integrated into liquid processing systems. These lack the flexibility to be used in connection with a variety of different types of purification systems.

The present disclosure for the first time provides a portable and high-throughput filtration system. The system provides a portable platform comprising from one to several filter units that may be operably linked to provide high flow filtering of liquids in need thereof. The filter(s) and corresponding platforms or skids comprises portable units that can be transported using conventional equipment such as trucks and trailers and can be assembled quickly and easily on a work site, such as a drilling site. Notably, the system is easily disassembled for transporting to a second site.

Figure 1:
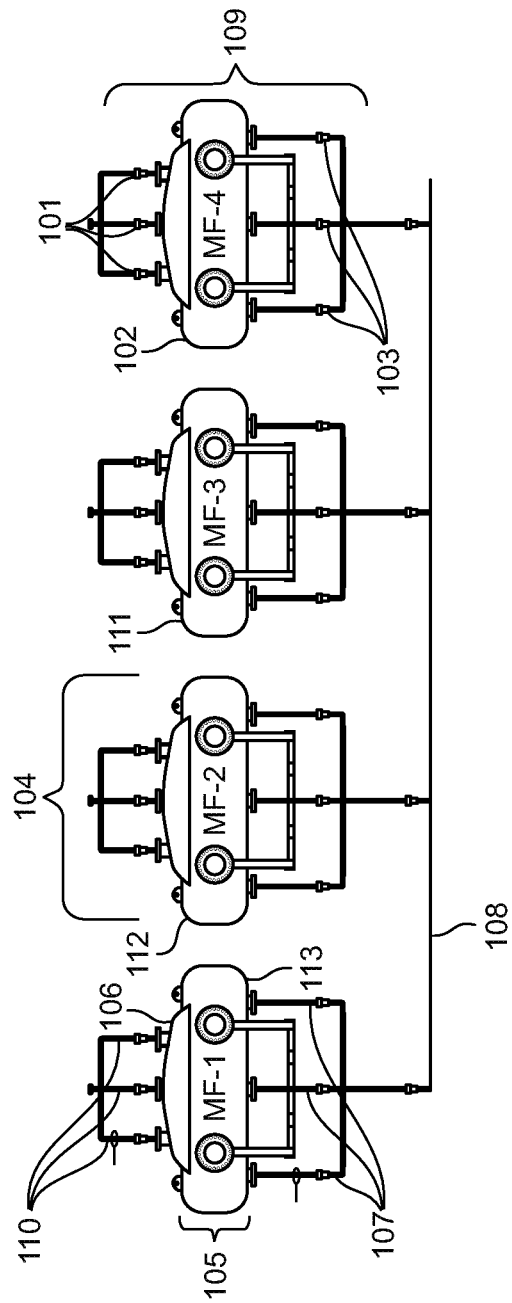
FIG. 1 is a diagram showing an overview of the filter system described herein.

Turning to the figures, FIG. 1 is a summary of the components of the portable liquid filtration system. It should be understood that flow of liquid occurs in the direction of the arrows in the figures. In one embodiment the filter unit 109 is comprised a filter 102 capable of holding filter media. The filter has a width 104 and height 105 and notably has a width greater than the height. In some embodiments the capacity of each filter is around at least 150 gallons per minute (gpm) to 1000 gpm, in some embodiments from 250 gpm to 850 gpm, in some embodiments 400 to 750 gpm, in some embodiments 500 gpm to 700 gpm, or at least around 350 gallons per minute, more preferably at least around 400 gallons per minute, more preferably at least around 500 gallons per minute, more preferably around 650 gallons per minute. When multiple filters are used combination the capacity is additive. For instance when four filters are used the capacity is around 2600 gallons per minute. In some embodiments the top of the filter is tiered such that it is higher at the middle when compared to the left and right sides 106. Conveniently, the filters are modular to allow for the addition of extra filtration units on the rear with a flange, such as a 12" inch flange, that connects to the main manifold. As described in more detail herein, each filter may include inlets that double as back-flush lines, discharge points, a one way gate valve on the back-flush line, a pressure indicator on the inlet line and a pressure indicator on the outlet line. In particular each filter may have 3 inlets that may vary in size as needed but in some embodiments the inlets include 3 6" inlet lines. Similarly, the discharge points and discharge lines may vary in size but in some embodiments they include three 8" discharge lines. The full filter system may additional include a discharge manifold that may vary in size but may be a 12" discharge manifold. It may also include in line water quality sensors as described in more detail herein. The system may also include a recirculation and/or discharge valve as well as a pressure sustaining valve that may be a 12" pressure sustaining valve. The system may include a flow meter and a back wash manifold such as a 6" back wash manifold. In addition the system may include electric solenoids, such as four 110 v solenoids. In addition the system may include 3 way control valves, such as a control valve for each media filter, i.e. 4 control valves if there are 4 media filter units. In addition the system may include a pressure differential control that triggers the back wash. The system may also include a pressure indicator on the inlet and a pressure indicator on discharge.

While the filters and filter units are designed to be transported independent from a liquid purification system, they are also designed to be integrated into a variety of different purification systems. Accordingly, the filters each have inlets 101 and outlets 103. While any number of inlets or outlets may be used in some embodiments each filter comprises from one to 6 inlets or outlets and more preferably comprises from 2 to 4, more preferably 3 inlets or outlets. In some embodiments the number of inlets may be the same as the number of outlets, although the number of inlets and outlets may also be the same. The outlets may then be connected to effluent lines 107, which lead to a discharge manifold 108.

The media filtration system comprises a series of filters that may be in line and in which liquid flows from one to the other or may be in parallel in which case liquid flows through only one filter and the efflux is collected and kept separate or combined as needed. The media may be the same in each of the filter systems 102, 111, 112 or 113, or may be different. In some embodiments the media is charcoal, glass filters. In some embodiments the media filter is preferably particulate small diameter anthracite coal and the particulates thereof. The anthracite coal particles preferably have a particle size of approximately between 0.5 mm to 1.15 mm in diameter. Another filter media may include particulate garnet and the particulates are preferably approximately 0.25 mm to 0.5 mm in diameter. Another filter media may include either particulate garnet or silica having an average particulate size of approximately between 1.15 mm to 2.0 mm in diameter. Another filter media may include particulate rock, the particulates having an average particulate size of approximately between 0.3 inches (0.7 cm) and 0.85 inches (2.2 cm) in diameter. Another filter media may include crushed glass or ground glass. The use of crushed glass as a particulate filtration media allows filtration of smaller/finer particles from the fluid due to the configurations and edge portions of the glass particles. Use of crushed glass as the filter media allows the instant system for removing contaminants from fluids to remove particles down to approximately 8 microns in size. Another media may include carbon. In some embodiments the media may be sand. In some embodiments the media may be graphine. In some embodiments the media may be garnet. In some embodiments the media may include gravel such as fine coarse gravel or ⅝" crushed gravel. In some embodiments the media may comprise a resin. Another media is manufactured by Yardney™ Water Filtration Systems of Riverside Calif., USA. IMA-65 has a unique property of chemically reacting with contaminants such as, but not limited to, Iron (Fe), and Manganese (Mg), and Arsenic (Ar), and is effective in removing these and other contaminants from the fluid. Further, IMA-65 reduces and/or eliminates the necessity of adding potassium permanganate into the fluid stream to cause effective coagulation, precipitation and filtration. In place of the added potassium permanganate, use of IMA-65 as a filtration media allows small amounts of chlorine (Cl) to be used in place of the potassium permanganate. In some embodiments the system also has an ultrafiltration media and RO treatment for the production of highly purified and if needed, deionized water.

The inlets 101 may be connected to influent lines 110, which are in liquid communication with a liquid source. By "liquid communication" is meant that a pipe or line connects different features such that liquid may flow between them. The liquid can be from any source that needs to be cleaned or purified. For instance, the source can be industrial water waste, such as but not limited to wasted from oil drilling and fracking sites, salt water, such as but not limited to ocean water, water supplies for cities and the like.

Figure 2:
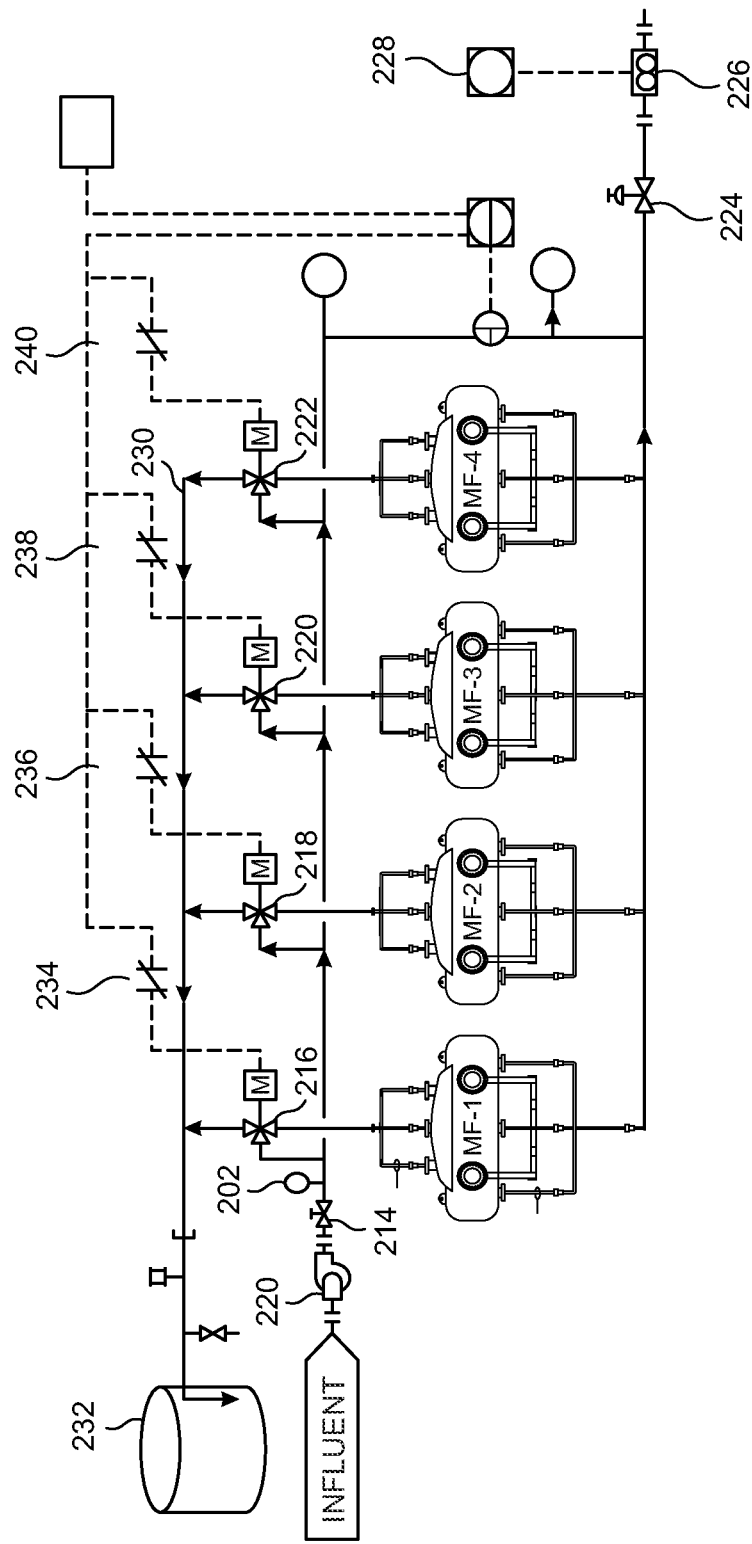
FIG. 2. is a diagram showing the integration of the filter system with other exemplary systems for liquid purification.

Turning to FIG. 2, flow of liquid, i.e. influent, through the line may be regulated by a diaphragm pump 220 or media filter pump 214. A pressure indicator 202 may be downstream and inline of the pumps. The influent then moves to the filter system. FIGS. 1 and 2 also describes the media filtration system 109.

In some embodiments the filter bodies are interconnected to one another by known plumbing apparatus and fittings so that inflow of fluid enters the inflow ports of each of the plural bodies generally simultaneously and percolates through the filter medias and exits the outflow ports generally simultaneously. Known plumbing connections communicating with the outflow ports thereafter communicate with selector valves that may be actuated to initiate backwash cleaning operations. In the parallel configuration, liquid flows to the influx of the media filtration where it enters the first filter, which is controlled by a first regulatory valve 216, such as a 3-way valve. Flow to a second and third (or more) filter is controlled by second and third valves 218 and 220. These valves control the flow of liquid into the media filter units. Once through the media filter units the liquid effluent leaves the filter unit via the effluent lines and discharge manifold. Downstream and inline with the discharge manifold is a pressure sustaining valve 224 powered by 110V electric power. Following flow through the filter system, the inline pressure sustaining valve 224 is in place to maintain appropriate pressure. In some embodiments this is from 25-50 psi, or 20-40 psi, more preferably 27-35 psi and more preferably around 30 psi. Also in line following flow through the filter system is at least one or more flow meters 226 and 228.

Figure 3:
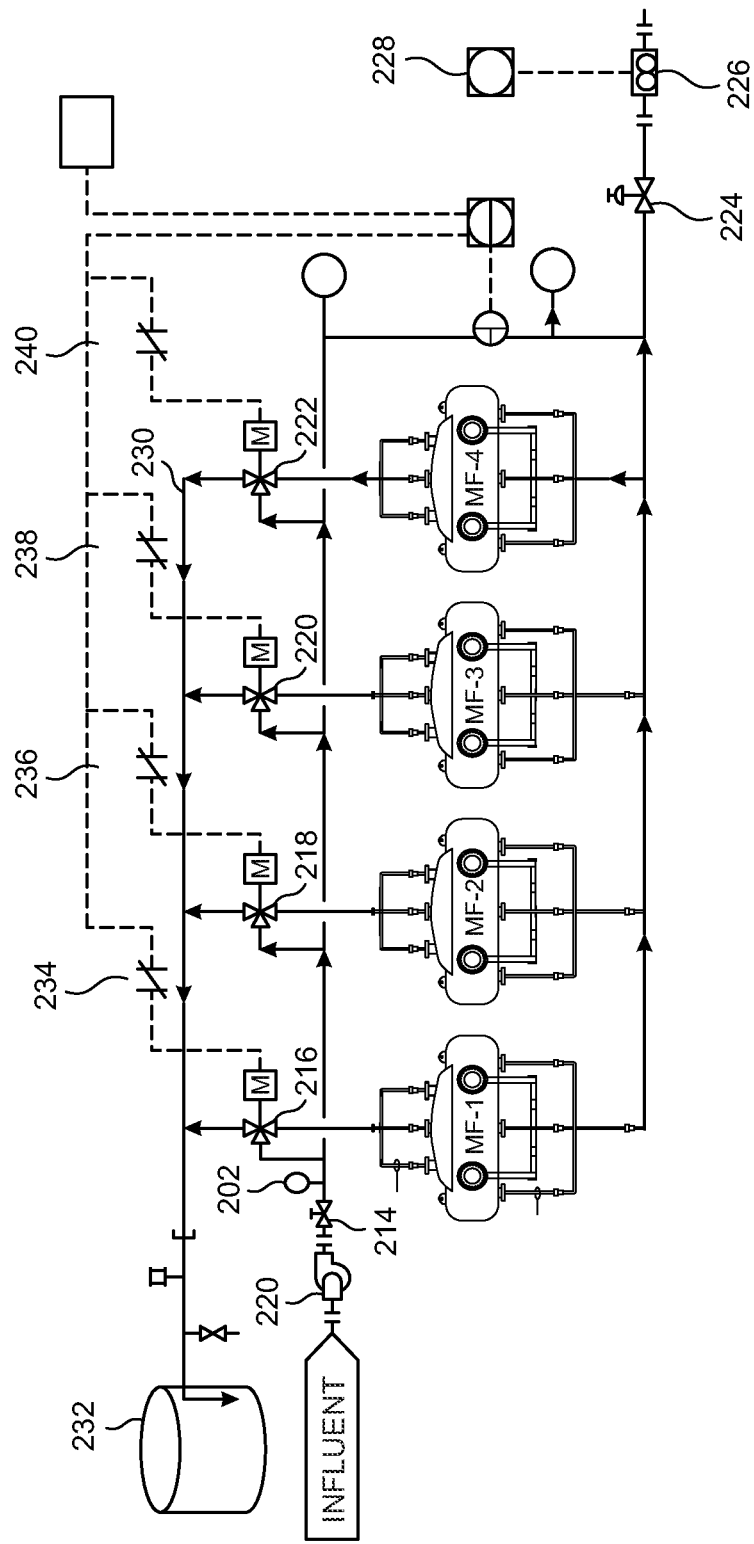
FIG. 3 is a diagram showing the system providing back wash of one of the media filter units.

Conveniently, liquid from the media filtration chamber may be used to backwash the system as controlled by the pressure sustaining valve 224. Features in FIG. 3 have the same label as in FIG. 2 but show an exemplary reverse liquid flow to backwash one of the media filters. One of skill in the art will understand that the same process occurs to backwash the other media filters as described herein. In some embodiments the system provides for automatic backwashing of the media filtration system. Conveniently, when engaged for backwashing liquid in the system is the backwashing liquid rather than bringing liquid from outside the system online to backwash the filters. That is, other system typically rely in water/liquid external to the purification system to backwash the filter. In contrast, the backwashing system of the present system is a closed liquid system for automatic backwashing of the media filter. In line following flow through each of the media filters is a pressure sustaining valve 224. This valve, as described above, maintains a fixed pressure in the line. Because liquid is being pumped through the filter units, the liquid will follow the path of least resistance. Because the pressure sustaining valve is downstream of all of the media filter units to flow past this valve the water must maintain a certain level. As a filter unit is used and debris inside increases the liquid flow will decrease. At a certain point the liquid will no longer flow through and some of the water from the discharge manifold will flow in a reverse direction from the bottom of the unit to out the top while the remainder of the liquid will flow through the discharge manifold. The 3 way-valve (216, 218, 220 or 222) at the top of the unit(s) will alter orientation to prevent the backwash liquid from flowing through the other units but will rather flow into a backwash line 230 to be discharged. In some embodiments this backwash liquid is discharged in a discharge tank (232). In some embodiments when the pressure differential between the top and bottom of a filter unit exceeds at last 5 psi, or at least 10 psi or at least 15 psi or at least 20 psi or between 5-20 psi, or between 7-15 psi, the system will shift to a backwash mode whereby liquid flows from the bottom to the top of the filter. In some embodiments once a first filter is backwashed the system automatically backwashes a second or third or more filter. In some embodiments the filters are backwashed sequentially. In some embodiments the filters are backwashed simultaneously. In this way, the liquid flows through the media filter in the reverse direction through the media filter, and exiting the system, thereby backwashing the filter. By way of non-limiting example, normally flow (as shown in FIG. 2) proceeds through the lines and filters from the top of each of the filters and out the bottom to the bottom line which flows through the pressure sustaining valve 224. However, when the pressure in one of the media filters falls below that of the pressure sustaining valve, the liquid no longer flows through the pressure sensing valve but the flow is altered such that it flows through the bottom of the filter with the low pressure and out the top, thereby backwashing the media filter. Electric relays 234, 236, 238 and 240 provide power to 3 way valves 216, 218, 220 and 222, respectively.

Figure 4:
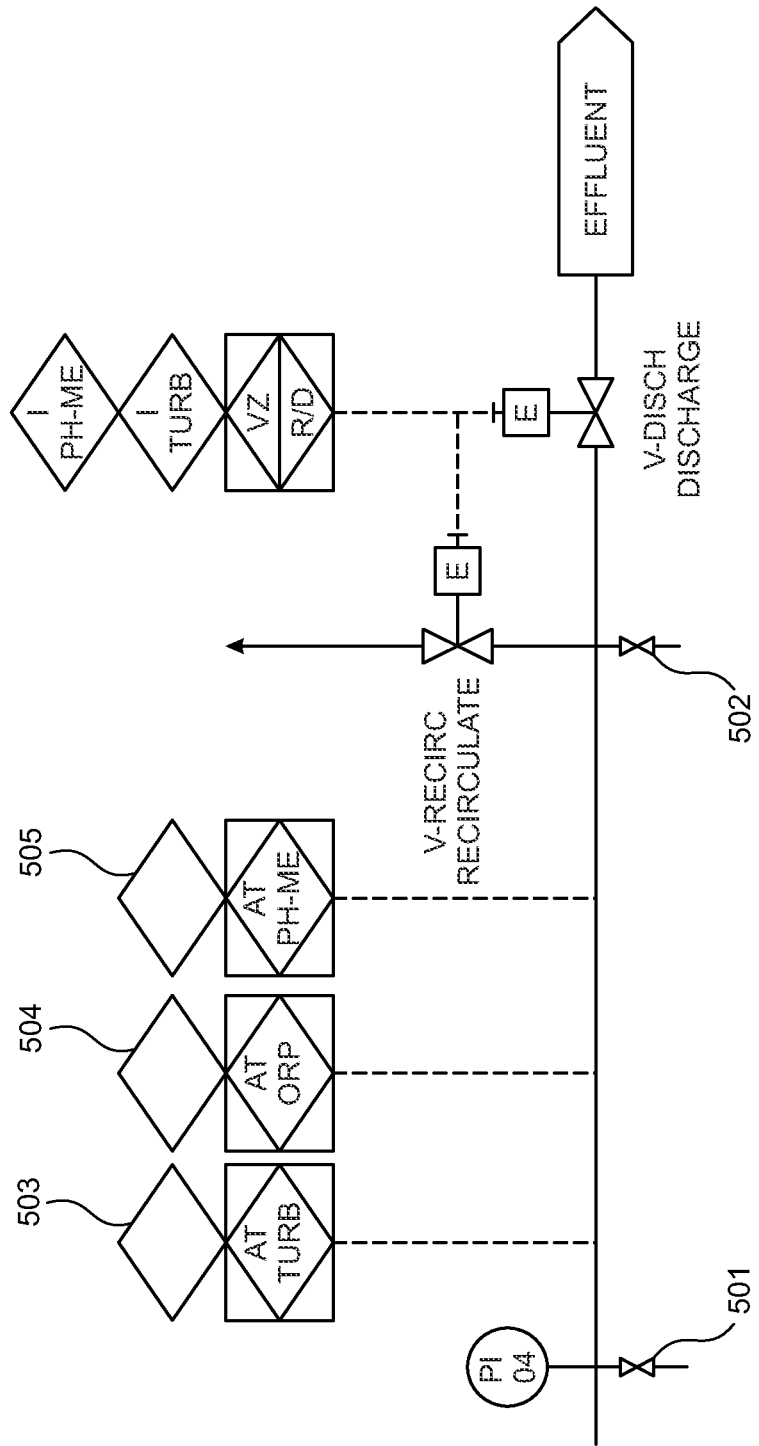
FIG. 4 is a diagram showing elements downstream of the filter units described herein.
Figure 5A:
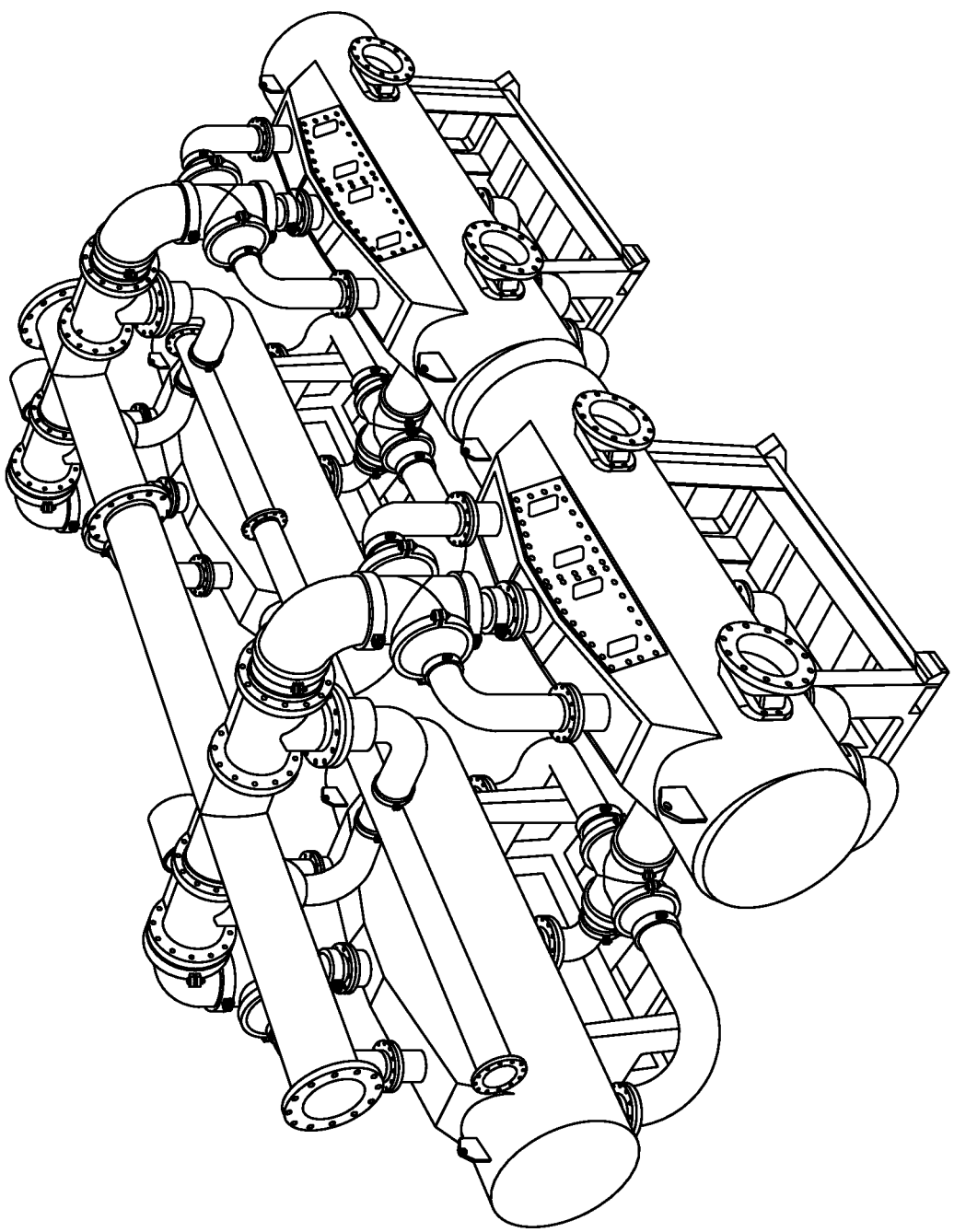
FIG. 5A, FIG. 5B and FIG. 5C are images of the filter system described herein.
Figure 5B:
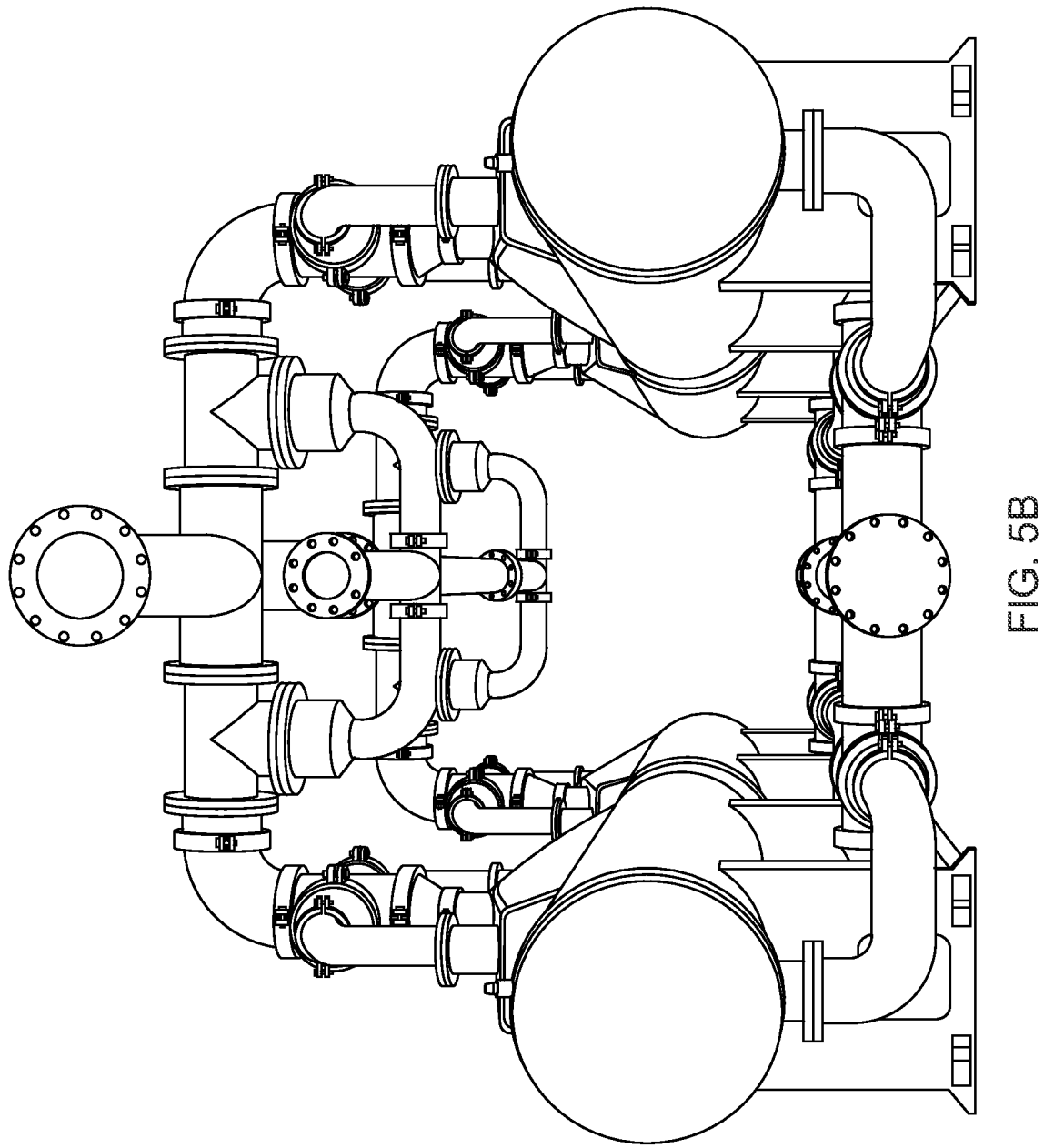
Figure 5C:
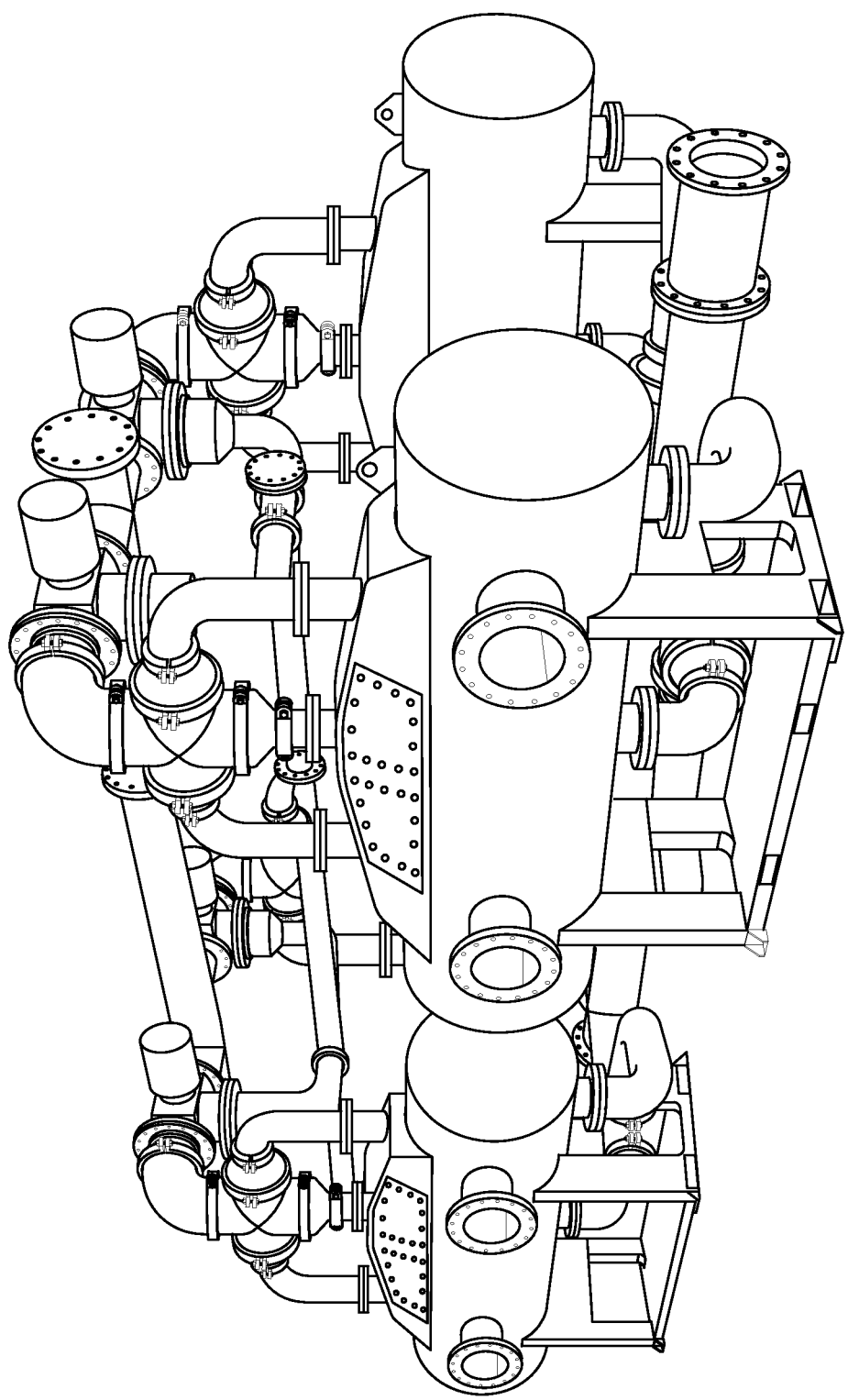

Downstream of the filtration unit a series of regulatory elements may be included. As shown in FIG. 4, these may include one or more sample ports 501 and 502, and may also include liquid quality sensors 503, 504 and 505. In some embodiments the sensors test for turbidity, oxidation reduction potential (ORP) and/or pH. In addition, downstream of the liquid quality sensors and following a sample port 502, an electronically controlled recirculation valve 506 may be in place. This enables the liquid to be recirculated through the media filter should the liquid not be of appropriate quality. Alternatively, liquid may flow through a discharge valve 507 to be used as purified liquid.

Figure 7:
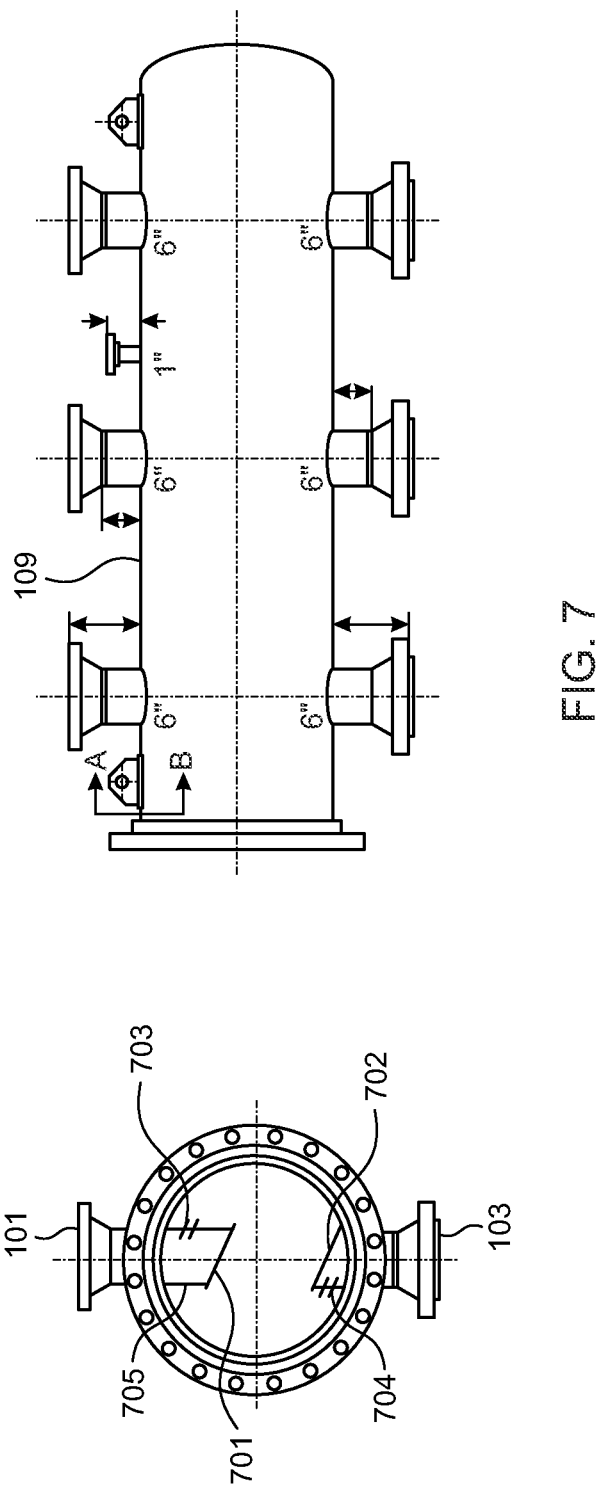
FIG. 7 depicts an end view and side view of the elements for agitating liquid in the system described herein.
Figure 8:
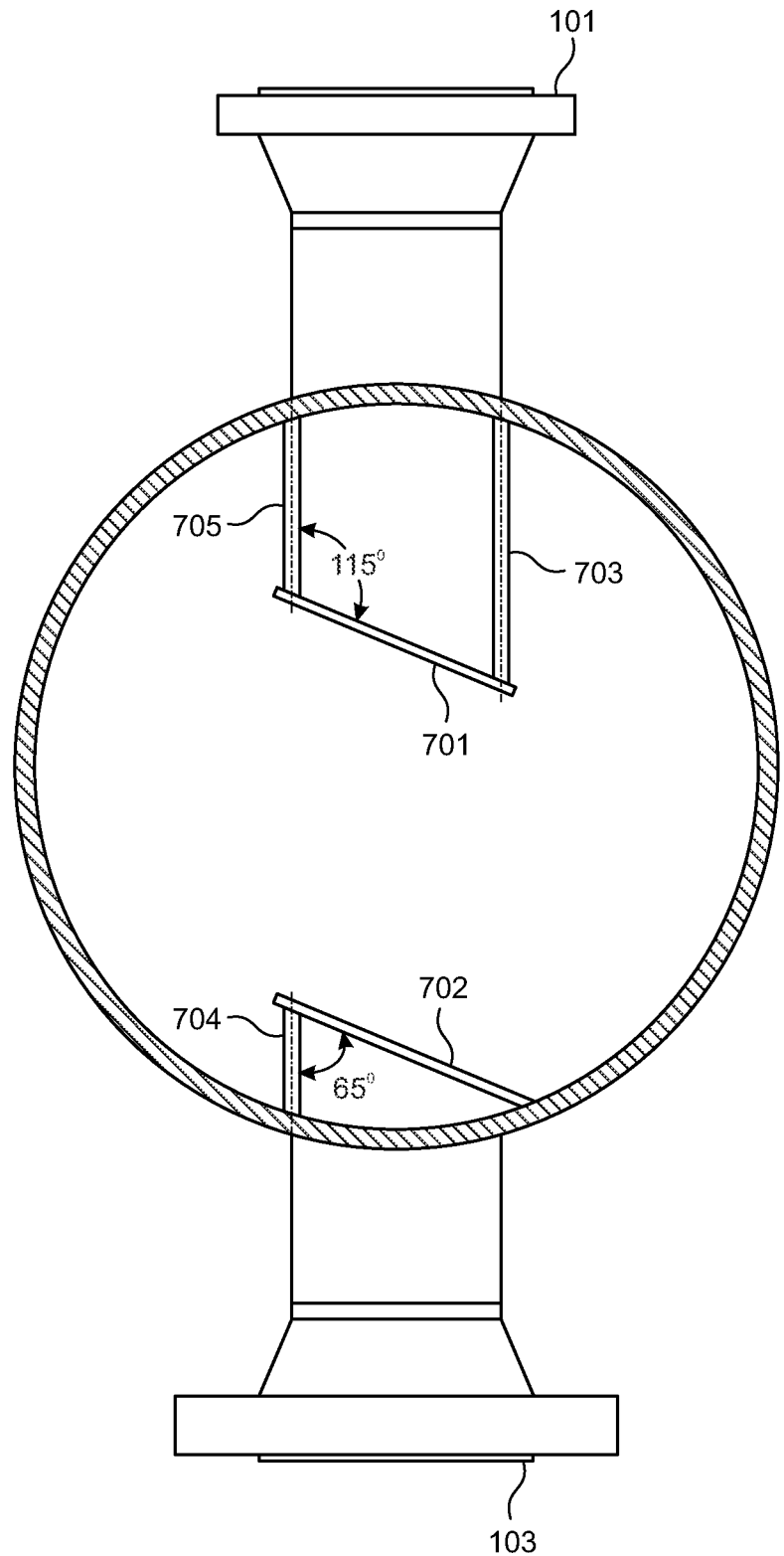
FIG. 8 depicts an enlarged end view of the elements for agitating liquid in the system described herein.

In one embodiment the filter system 109 includes an internal system for agitating liquid. As shown in FIGS. 7 and 8 at the base of the liquid inlet element is a slanted plate 701. The slanted plate 701 is attached to the liquid inlet element via vertical plates 703 and 705. The vertical plates may be a part of the sides of the liquid inlet element or may be attached to the inside of the filter 102. Notably the vertical walls have at least one opening and may have more, such as, but not including 2, 3, 4 or 10 or more openings to allow liquid flow. In some embodiments the opening may be a mesh with pore sizes that can be selected based on the size of the particles to be removed from a particular liquid purification project.

As water will flow in the direction of least resistance, it will flow down the plate. While the plate may be angled down to either the left or right, the downward angle from the terminus of the short vertical side may be from 91° to 179° or more preferably from 100° to 150° or more preferably from 110° to 125° or more preferably about 110°, 111°, 112°, 113°, 114°, 115°, 116°, 117°, 118°, 119°, 120°, 121°, 122°, 123°, 124°, or 125°. Thus, as liquid flows into the filter chamber it will move down the angled plate in to the filter chamber.

In another embodiment the filter unit contains a slanted plate at the bottom of the filter chamber. As shown in FIGS. 7 and 8, the bottom of the filter unit may include a slanted plate 702. In one embodiment the slanted plate 7-2 is a solid piece that is slanted in the same direction as the upper slanted plate 701. That is, when the upper plate slants down from left to right, the lower plate also slants down from left to right. The lower side of the lower slanted plate 702 may be a part of the liquid outlet element 103 or may be fixed to the inside of the filter chamber. Alternatively, it may also be affixed to a vertical arm connecting to the bottom of the chamber or the liquid outlet element. In any event, the slanted plate is held at a slant by a vertical arm 704 affixed to the higher side of the slanted plate. In some embodiments this vertical arm or wall 704 will have at least one opening and may have more, such as, but not including 2, 3, 4 or 10 or more openings to allow liquid flow. The openings in the taller, bottom vertical wall 704 allow for liquid to flow out of the filter chamber though the liquid outlet element 103. In some embodiments the lower slanted plate 702 will be slanted at an angle between the higher, lower vertical arm 704 around 1° to 89°, more preferably from 10° to 80°, more preferably from 30° to 75°, more preferably from 45° to 70° and more preferably at 50°, 51°, 52°, 53°, 54°, 55°, 56°, 57°, 58°, 590, 60°, 61°, 62°, 63°, 64°, 65°, 66°, 67°, 68°, 69° or 70°.

Figure 9:
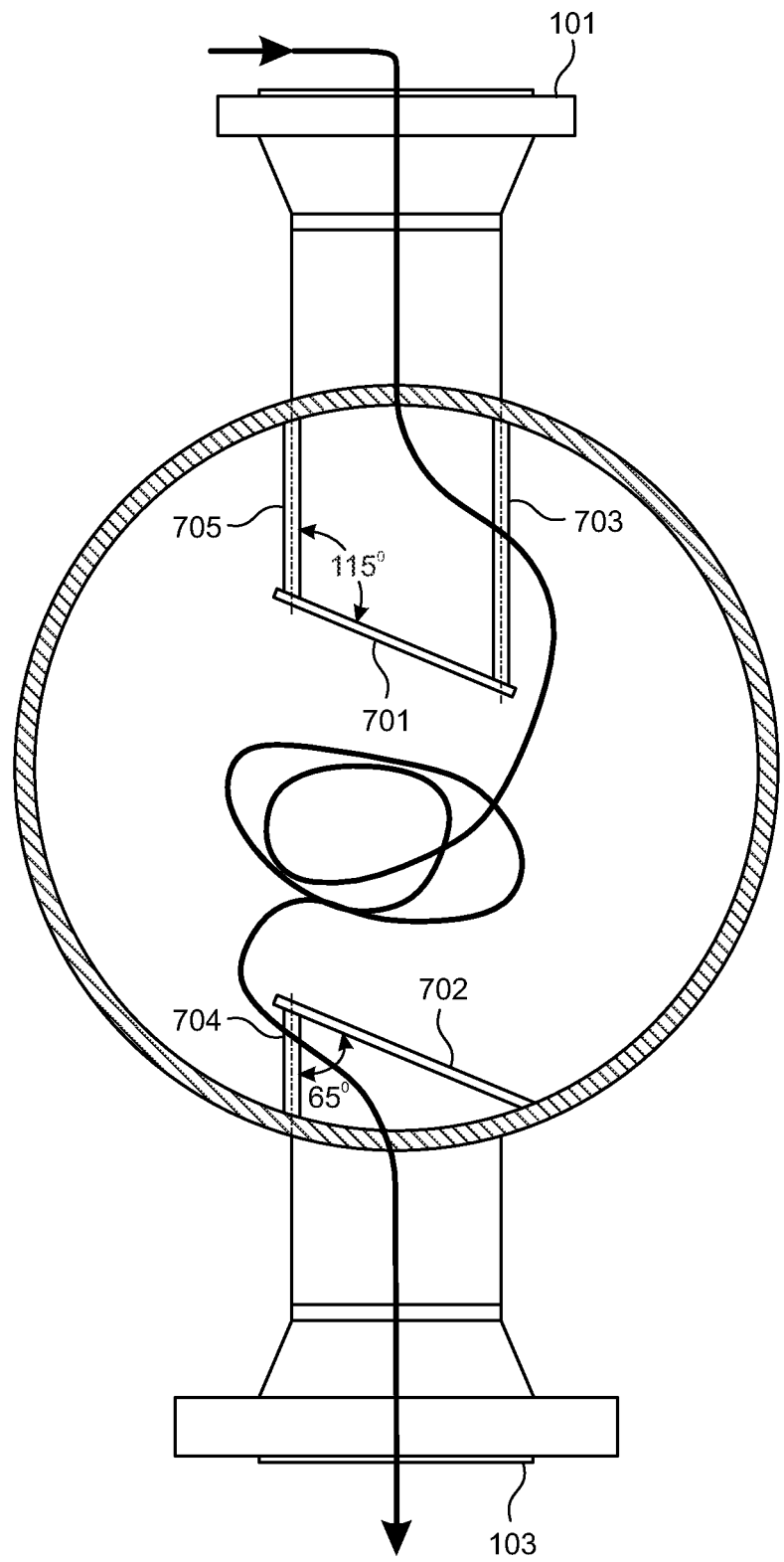
FIG. 9 depicts flow of liquid through the system described herein
Figure 10:
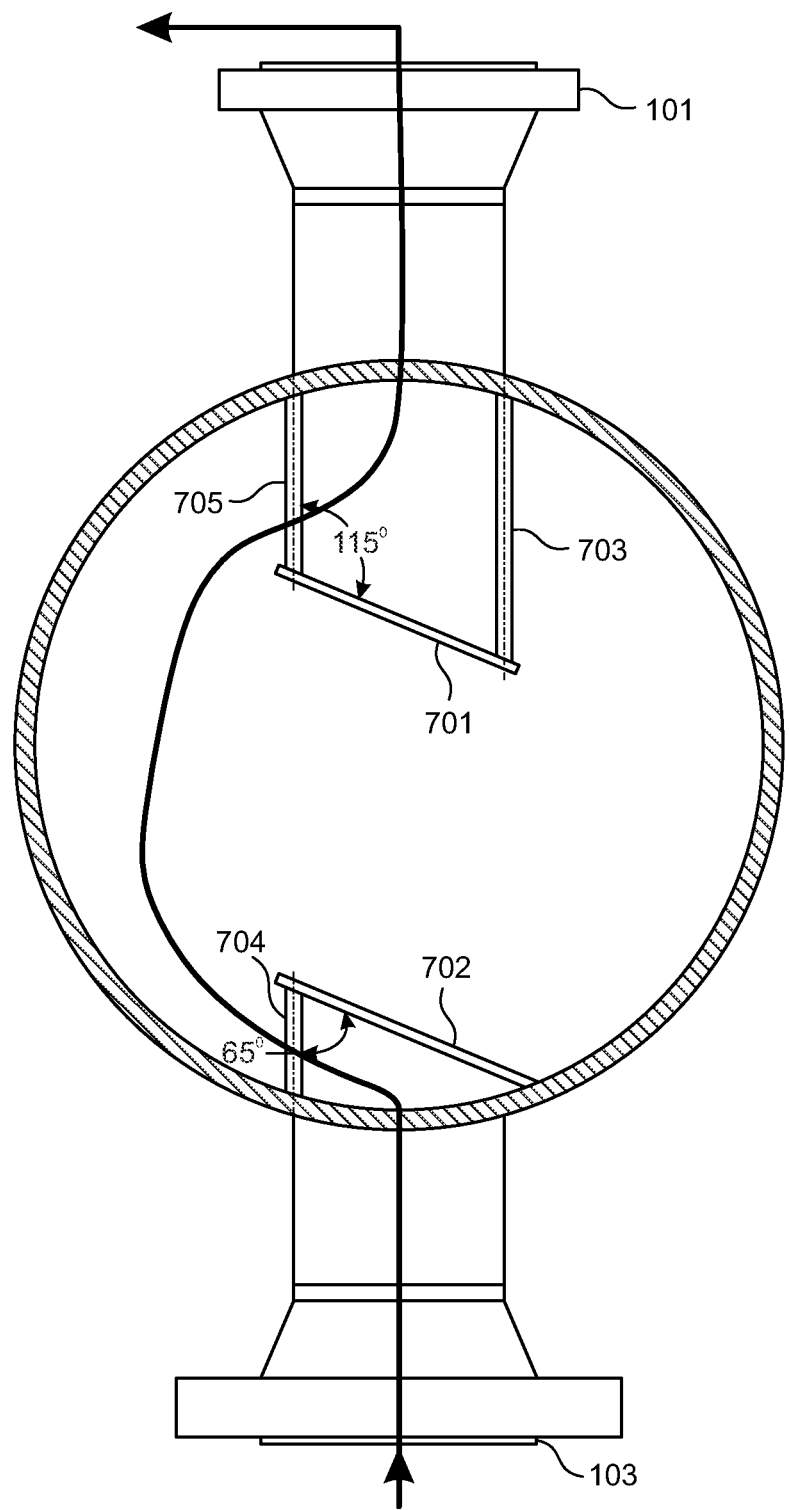
FIG. 10 depicts flow of liquid through the system described herein to backwash the system.

In one embodiment, in view of the above configuration of plates inside the filter units, the system provides a method for agitating liquid as it is pumped through the system. Liquid enters the filter inlet element and proceeds down the upper slanted plate 703 into the media filter chamber where it is mixed with filter media until it leaves the filter chamber via the opening in the vertical wall supporting the lower slanted plate 704 (See FIG. 9). Notably, this configuration also provides for a system of cleaning the filter media by backwashing liquid through the filter chambers. As shown in FIG. 10 the flow of liquid may be reversed and flowed through the bottom liquid outlet port 103 where it flows into the lower slanted plate and proceeds into the media chamber via the holes in the vertical wall 704. After mixing with the media where impurities are removed, the liquid flows through the vertical walls 703 and/or 705 and out the inlet port 101. As such, the filter units are configured for agitating the liquid with the media to improve purification of the liquid. In addition, the configuration provides for cleaning the media by backwashing the media.

Figure 11:
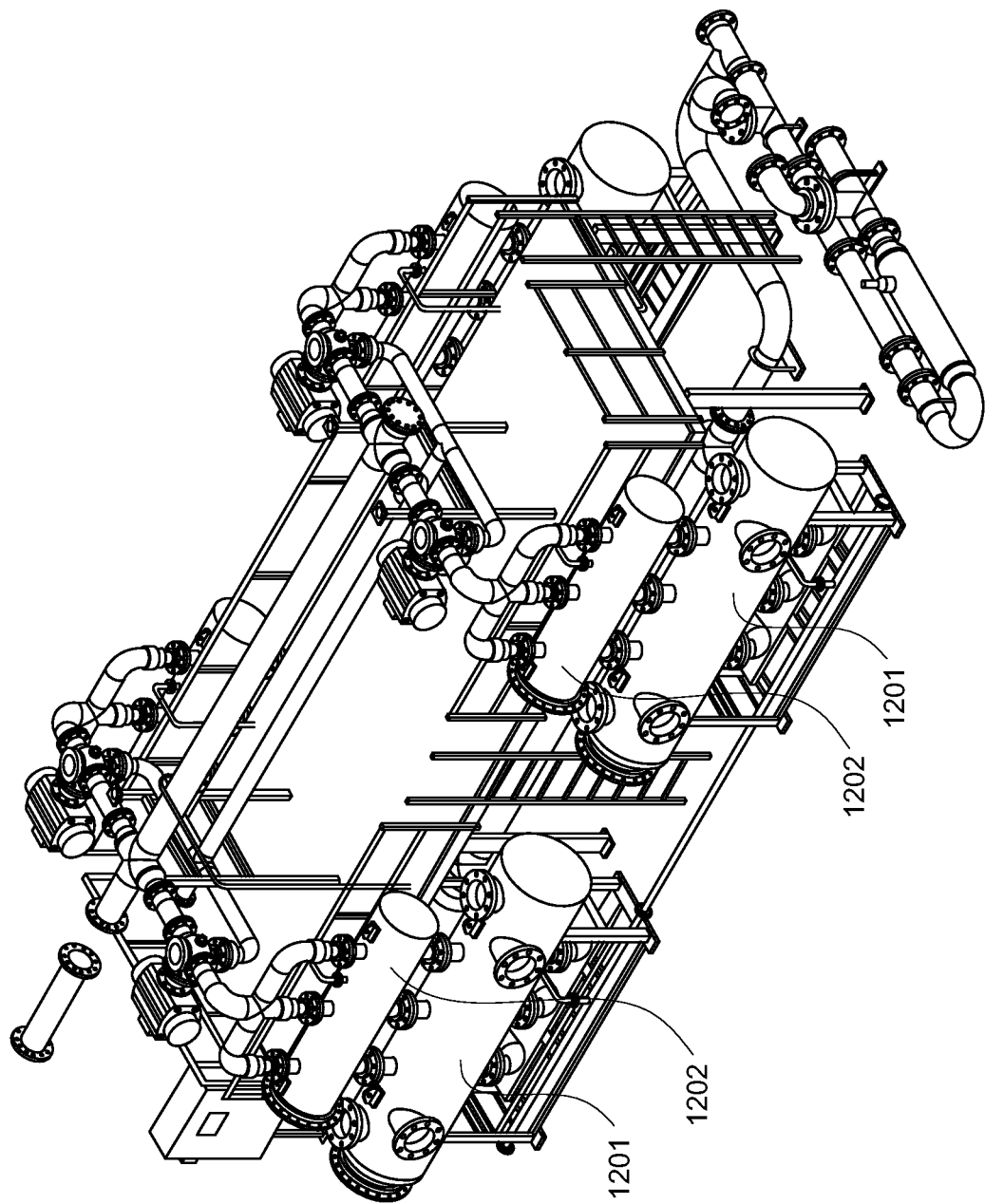
FIG. 11 depicts a two component liquid filtration system including an upper liquid mixing chamber 1201 and a lower chamber 1202 containing filter media.

In an alternative embodiment, the filter unit is comprised of two chambers as shown in FIG. 11. Here, the media is in the lower chamber 1201. In this configuration the top chamber 1202 is similar to the filter chamber shown in FIG. 8 with the exception that filter media is not found in the top chamber 1202. In this alternative embodiment, shown in FIG. 12, as liquid flows into the top chamber 1202 it flows past the upper slanted plate 1203 shown in FIG. 12 and creates a vortex in the top chamber. Without being bound by theory it is thought the vortex causes the impurities to move to the center of the vortex with the purified liquid flowing out of the top chamber into the lower chamber which contains the media as described herein. Accordingly, the top chamber provides a preliminary purification prior to liquid flowing into the unit containing the media. This, configuration also provides for a system of cleaning the filter media by backwashing liquid through the filter chambers. As shown in FIG. 10 the flow of liquid may be reversed and flowed through the bottom to the top of the system. In the configuration shown in FIG. 11 and FIG. 12, liquid is flossed from the lower media containing chamber 1201 up through the upper chamber 1202. When the water flow is reversed in this manner, the water flows against the lower slanged plate 1204 and creates a vortex, again facilitating purification of the media and removal of impurities from the liquid in the system. After mixing with the media where impurities are removed, the liquid flows through the vertical walls 703 and/or 705 and out the inlet port 101. As such, the filter units are configured for agitating the liquid with the media to improve purification of the liquid. In addition, the configuration provides for cleaning the media by backwashing the media.

Figure 12:
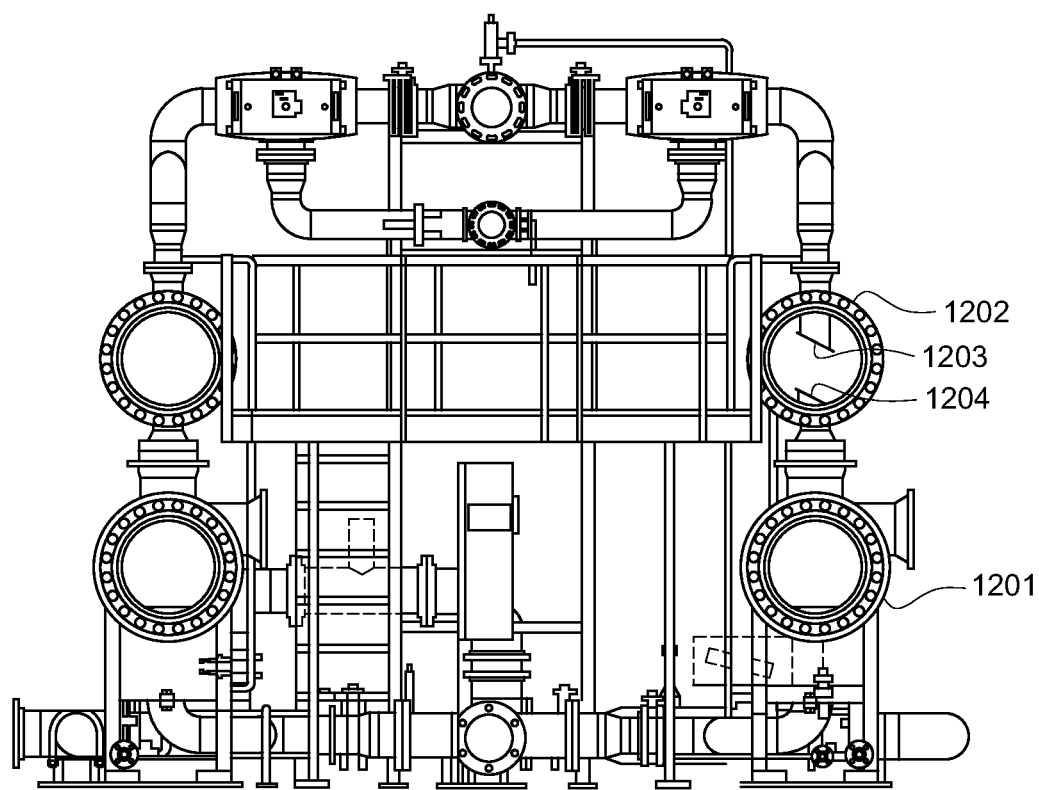
FIG. 12 depicts a two component liquid filtration system including an upper liquid mixing chamber 1201, showing slanted interior walls to provide for mixing of the liquid and a lower chamber 1202 containing filter media.
Figure 13:
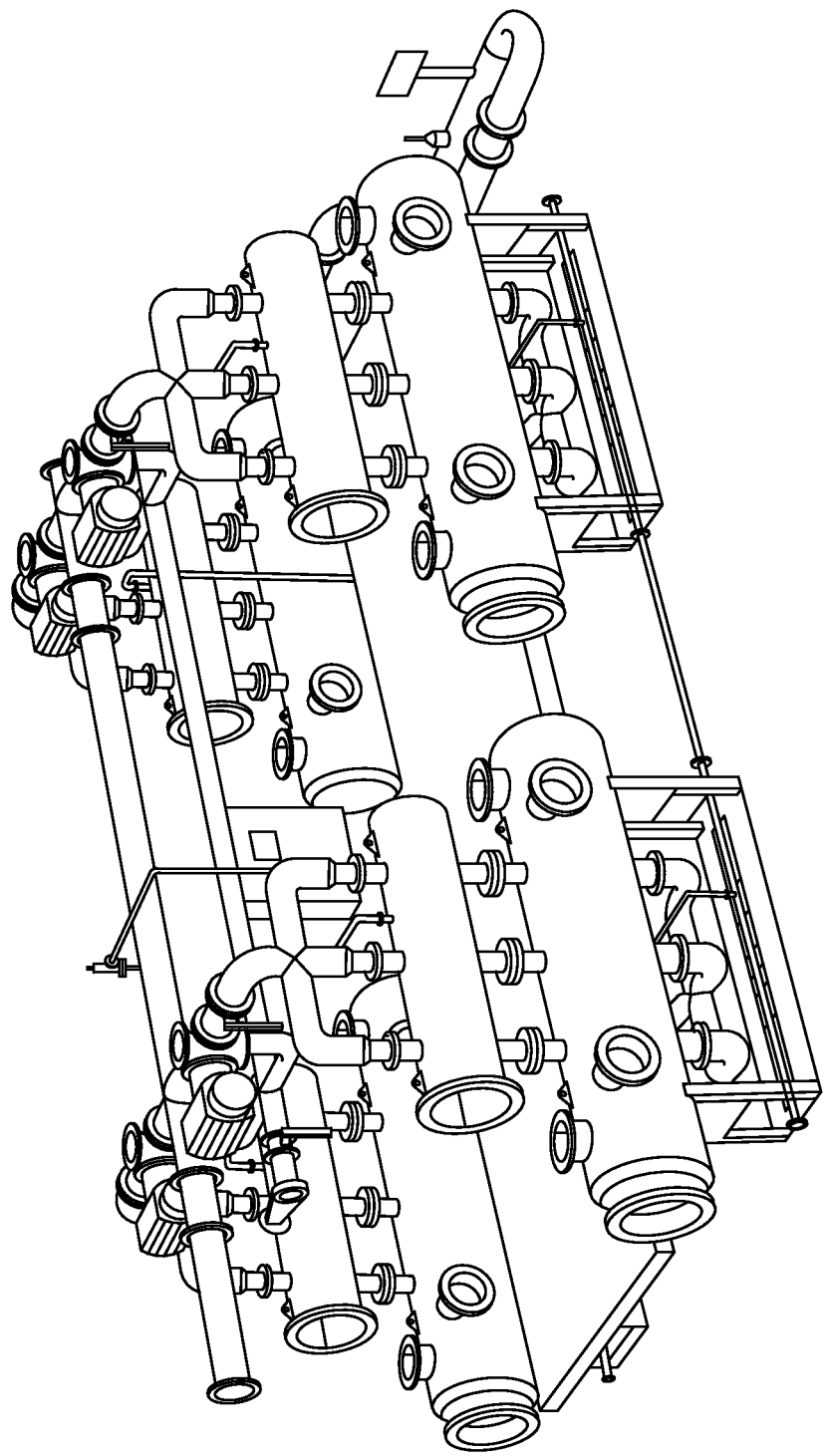
FIG. 13 is an image of the filter system described herein.
Figure 14A:
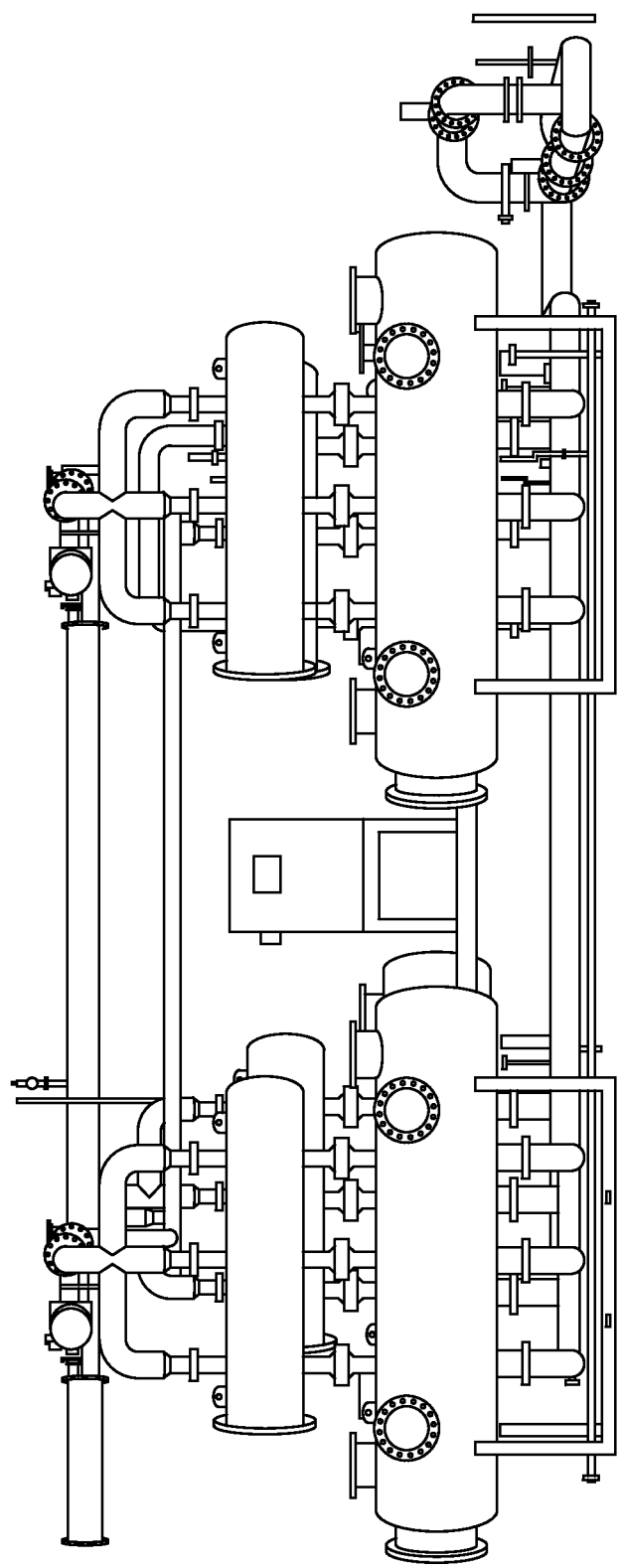
FIG. 14 *a* and FIG. 14*b* are images of the filter system described herein.
Figure 14B:
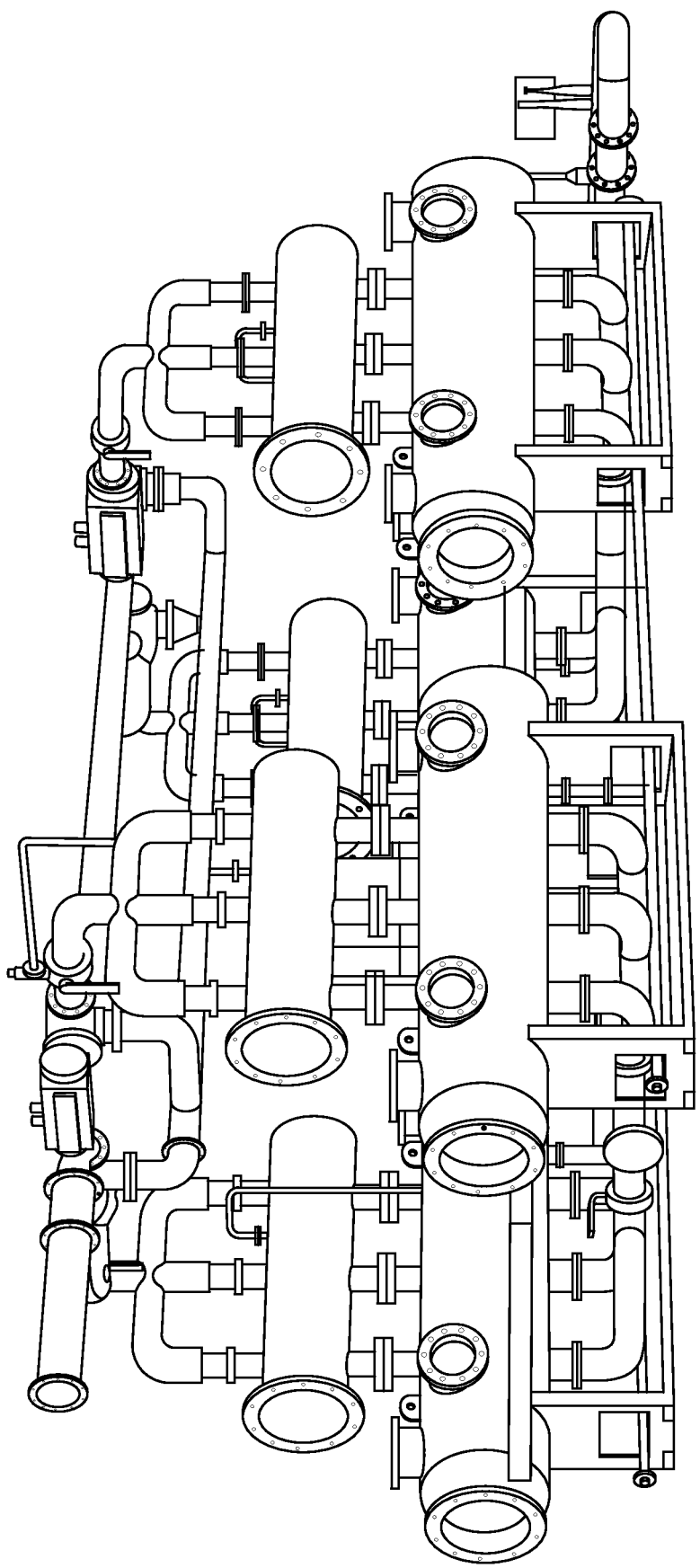

In some embodiments the media filtration system shown in FIG. 1, 2, 3 may be used as the lower chamber 1201 shown in FIGS. 11 and 12. In these embodiments, the chamber 1202 is configured such that liquid flows from the chamber 1202 to the media filtration system in the lower chamber 1201.

One of the many benefits of the system as described herein is that it is conveniently portable. The system can be assembled and disassembled with ease and transported from site to site using conventional and traditional trucks and trailers. In some embodiments the components of the system are affixed to or stored in trailers, making for convenient transportation. Importantly, the filter system described herein can be adapted to be installed in a variety of purification or other systems. Thus, the filters can be added easily into any systems as the inlet, back flush, and discharge manifold are flanged for easy connection into any in-line system. through 12 inch connections on the inlet and discharge manifolds and 6 inch connections on the backlash manifold.

In one preferred embodiment the purification system is controlled by a computer running software configured to operate the valves and pumps as necessary to purify the source liquid to achieve predetermined parameters. In some embodiments pre-determined parameters include pH from 7.4-8.4, more preferably pH from 7.4-8.2 and an ORP of greater than zero and less than 300, more preferably from 40-200 and more preferably from 90-160.

In some embodiments the sensors are in communication with the computer either by direct wiring or via wireless connection. The software is configured to obtain sensor results and modify valves and pumps accordingly by increasing or decreasing flow, direction, and/or treatment. In some embodiments when the liquid has not achieved appropriate conditions, additional treatments are employed. These may include a repeat of prior treatments or application of new treatments. In some embodiments this includes the use of additional chemicals or filtration steps.

Accordingly, the present disclosure provides a mobile system for high-throughput purification of liquid. In some embodiments the system can purify from 100 to 10000 barrels per minute (bpm), more preferably 1000 to 5000 bpm, more preferably around 2000 bpm. One reason for this high throughput volume is that the system uses pipes ranging from 6 to 10 inches in diameter, more preferably from 6-8 inches in diameter, more preferably around 8 inches in diameter.

Figure 6:
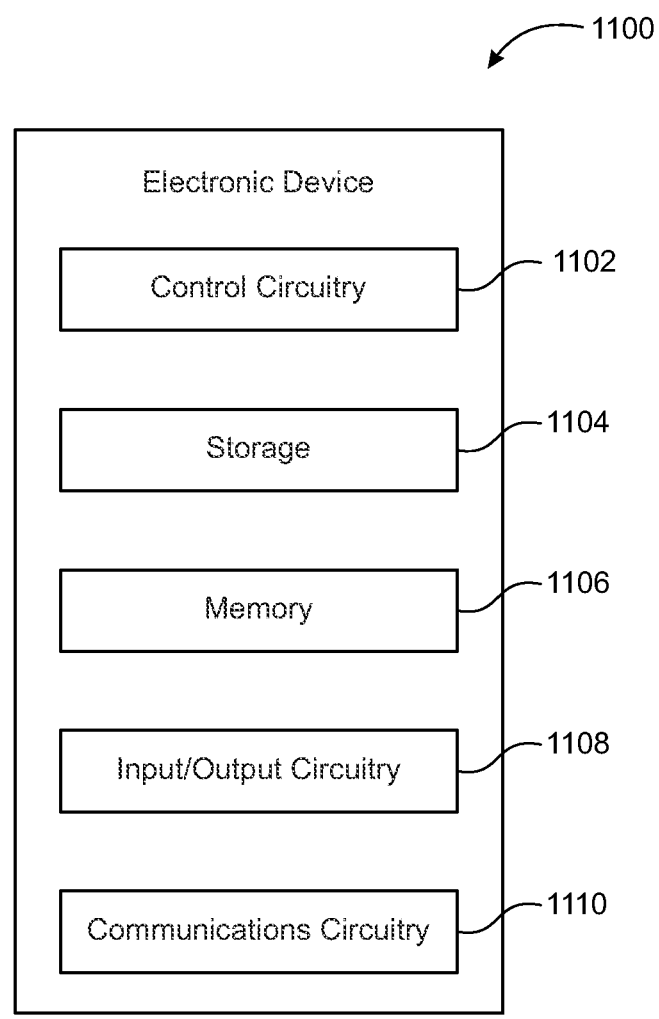
FIG. 6 is a block diagram of an illustrative electronic device for participating in the purification system in accordance with some embodiments of the invention.

FIG. 6 is a block diagram of an illustrative but not limiting electronic device for monitoring and/or controlling the purification system in accordance with some embodiments of the invention. Electronic device 1100 can include control circuitry 1102, storage 1104, memory 1106, input/output ("I/O") circuitry 1108, and communications circuitry 1110. In some embodiments, one or more of the components of electronic device 1100 can be combined or omitted (e.g., storage 1104 and memory 1106 may be combined). In some embodiments, electronic device 1100 can include other components not combined or included in those shown in FIG. 6 or several instances of the components shown in FIG. 6. For the sake of simplicity, only one of each of the components is shown in FIG. 6.

Electronic device 1100 can include any suitable type of electronic device. For example, electronic device 1100 can include a portable electronic device that the user may hold in his or her hand, such as a smartphone (e.g., an iPhone made available by Apple Inc. of Cupertino, Calif. or an Android device such as those produced and sold by Samsung). As another example, electronic device 1100 can include a larger portable electronic device, such as a tablet or laptop computer. As yet another example, electronic device 1100 can include a substantially fixed electronic device, such as a desktop computer.

Control circuitry 1102 can include any processing circuitry or processor operative to control the operations and performance of electronic device 1100. For example, control circuitry 1102 can be used to run operating system applications, firmware applications, media playback applications, media editing applications, or any other application. In some embodiments, control circuitry 1102 can drive a display and process inputs received from a user interface.

Storage 1104 can include, for example, one or more storage mediums including a hard-drive, solid state drive, flash memory, permanent memory such as ROM, any other suitable type of storage component, or any combination thereof. Storage 1104 can store, for example, media data (e.g., music and video files), application data (e.g., for implementing functions on electronic device 1100), firmware, user preference information data (e.g., media playback preferences), authentication information (e.g. libraries of data associated with authorized users), lifestyle information data (e.g., food preferences), exercise information data (e.g., information obtained by exercise monitoring equipment), transaction information data (e.g., information such as credit card information), wireless connection information data (e.g., information that can enable electronic device 1100 to establish a wireless connection), subscription information data (e.g., information that keeps track of podcasts or television shows or other media a user subscribes to), contact information data (e.g., telephone numbers and email addresses), calendar information data, and any other suitable data or any combination thereof.

Memory 1106 can include cache memory, semi-permanent memory such as RAM, and/or one or more different types of memory used for temporarily storing data. In some embodiments, memory 1106 can also be used for storing data used to operate electronic device applications, or any other type of data that can be stored in storage 1104. In some embodiments, memory 1106 and storage 1104 can be combined as a single storage medium.

I/O circuitry 1108 can be operative to convert (and encode/decode, if necessary) analog signals and other signals into digital data. In some embodiments, I/O circuitry 1108 can also convert digital data into any other type of signal, and vice-versa. For example, I/O circuitry 1108 can receive and convert physical contact inputs (e.g., from a multi-touch screen), physical movements (e.g., from a mouse or sensor), analog audio signals (e.g., from a microphone), or any other input. The digital data can be provided to and received from control circuitry 1102, storage 1104, memory 1106, or any other component of electronic device 1100. Although I/O circuitry 1108 is illustrated in FIG. 6 as a single component of electronic device 1100, several instances of I/O circuitry 1108 can be included in electronic device 1100.

Electronic device 1100 can include any suitable interface or component for allowing a user to provide inputs to I/O circuitry 1108. For example, electronic device 1100 can include any suitable input mechanism, such as for example, a button, keypad, dial, a click wheel, or a touch screen. In some embodiments, electronic device 1100 can include a capacitive sensing mechanism, or a multi-touch capacitive sensing mechanism.

In some embodiments, electronic device 1100 can include specialized output circuitry associated with output devices such as, for example, one or more audio outputs. The audio output can include one or more speakers (e.g., mono or stereo speakers) built into electronic device 1100, or an audio component that is remotely coupled to electronic device 1100 (e.g., a headset, headphones or earbuds that can be coupled to communications device with a wire or wirelessly).

In some embodiments, I/O circuitry 1108 can include display circuitry (e.g., a screen or projection system) for providing a display visible to the user. For example, the display circuitry can include a screen (e.g., an LCD screen) that is incorporated in electronics device 1100. As another example, the display circuitry can include a movable display or a projecting system for providing a display of content on a surface remote from electronic device 1100 (e.g., a video projector). In some embodiments, the display circuitry can include a coder/decoder (CODEC) to convert digital media data into analog signals. For example, the display circuitry (or other appropriate circuitry within electronic device 1100) can include video CODECs, audio CODECs, or any other suitable type of CODEC.

The display circuitry also can include display driver circuitry, circuitry for driving display drivers, or both. The display circuitry can be operative to display content (e.g., media playback information, application screens for applications implemented on the electronic device, information regarding ongoing communications operations, information regarding incoming communications requests, or device operation screens) under the direction of control circuitry 802. Alternatively, the display circuitry can be operative to provide instructions to a remote display.

Communications circuitry 1110 can include any suitable communications circuitry operative to connect to a communications network and to transmit communications (e.g., voice or data) from electronic device 1100 to other devices within the communications network. Communications circuitry 1110 can be operative to interface with the communications network using any suitable communications protocol such as, for example, Wi-Fi (e.g., a 802.11 protocol), Bluetooth. radio frequency systems (e.g., 900 MHz, 1.4 GHz, and 5.6 GHz communication systems), infrared, GSM, GSM plus EDGE, CDMA, LTE and other cellular protocols, VOIP, or any other suitable protocol.

In some embodiments, communications circuitry 1110 can be operative to create a communications network using any suitable communications protocol. For example, communications circuitry 1110 can create a short-range communications network using a short-range communications protocol to connect to other devices. For example, communications circuitry 1110 can be operative to create a local communications network using the Bluetooth protocol to couple electronic device 1100 with a Bluetooth headset.

Electronic device 1100 can include one more instances of communications circuitry 1110 for simultaneously performing several communications operations using different communications networks, although only one is shown in FIG. 6 to avoid overcomplicating the drawing. For example, electronic device 1100 can include a first instance of communications circuitry 1110 for communicating over a cellular network, and a second instance of communications circuitry 1110 for communicating over Wi-Fi or using Bluetooth. In some embodiments, the same instance of communications circuitry 1110 can be operative to provide for communications over several communications networks.

In some embodiments, electronic device 1100 can be coupled a host device for data transfers, synching the communications device, software or firmware updates, providing performance information to a remote source (e.g., providing riding characteristics to a remote server) or performing any other suitable operation that can require electronic device 1100 to be coupled to a host device. Several electronic devices 1100 can be coupled to a single host device using the host device as a server. Alternatively or additionally, electronic device 1100 can be coupled to several host devices (e.g., for each of the plurality of the host devices to serve as a backup for data stored in electronic device 1100).

Once made, the system finds use in purification of a variety of liquid sources. Purification includes bringing a source liquid into the system for processing. This is in most instances accomplished by engaging one or more pumps in the system such flow of liquid proceeds through the system for the desired outcome as described herein. In one embodiment flow of liquid is controlled manually by changing valves and/or engaging pumps as needed. However, in some embodiments the computer that controls the valves controls the flow and pumps as described herein. For instance, the system provides for a user to program the system to flow the liquid through one or more features of the system such that liquid achieves a particular purity or other characteristic. In this embodiment, the sensors of the system communicate with the computer to provide information on the quality of the liquid and in response the computer modifies the flow of the liquid as needed to achieve pre-determined liquid characteristic profile.

The previous description is of a preferred embodiment for implementing the invention, and the scope of the invention should not necessarily be limited by this description. The scope of the present invention is instead defined by the following claims.

The invention claimed is:

1. A portable filter system for high throughput purification of liquids comprising:
 a platform comprising from two to eight filter units, each filter unit being of a width and height and a top and bottom, wherein the width is greater than the height, wherein each of the filter units comprises a first filter media and wherein each of the filter units comprises at least one inlet and at least one outlet, the at least one inlet connected, via a plurality of valves, to a liquid source and a backwash line, and the at least one outlet connected to a discharge line;
 a pressure sustaining valve downstream of the discharge line configured to sustain pressure of at least 20-50 pounds per square inch (psi); and
 control circuitry in operable communication with at least the plurality of valves and the pressure sustaining valve, wherein each filter unit is configured to filter 650 to 850 gallons per minute using non-compressible or non-polymeric media, wherein the filter units are sized such that at least two filter units are transportable on a conventional size trailer, wherein at least first and second filters of the two to eight filter units configured for liquid to flow into and out of the first and second filters into the discharge line when the plurality of valves are controlled by the control circuitry in a first position, and wherein the first and second filters are configured for the liquid to flow into and out of the first filter into the discharge line and further flow from the discharge line into the outlet and out of the inlet of the second filter and into the backwash line when the plurality of valves are controlled by the control circuitry in a second position to backwash the second filter such that the second filter backwashes with only filtered liquid from the discharge line.

2. The portable filter system of claim 1, wherein the filter units have at least three inlets capable of being configured to at least three inlet lines.

3. The portable filter system of claim 1, wherein the filter units have at least three outlets capable of being connected to a discharge manifold by at least three outlet lines.

4. The portable filter system of claim 1, wherein the first filter media is crushed glass, ground glass, carbon, sand, graphine, garnet, fine coarse gravel, anthracite, ⅝" crushed gravel or a resin.

5. The portable filter system of claim 1, wherein each filter unit comprises three six inch inlets.

6. The portable filter system of claim 1, wherein each filter unit comprises three eight inch outlets.

7. A method of purifying liquid, the method comprising:
 providing a portable filter comprising:
  a platform comprising from two to eight filter units, wherein each of the filter units comprises at least one inlet and at least one outlet, the inlet connected, via a plurality of valves, to a liquid source and a backwash line, and the outlet connected to a discharge line, wherein the filter units are sized such that at least two filter units are transportable on a conventional size trailer, and
  a pressure sustaining valve downstream of the discharge line;
 administering a liquid flowing into at least one of the filter units via at least one inlet, wherein the liquid mixes with filter media, wherein at least partially purified liquid flows through the at least one outlet to the discharge line, wherein a pressure sustaining valve sustains pressure of at least 20-50 pounds per square inch (psi), and wherein each of the filter units filters 650 to 850 gallons per minute using non-compressible or non-polymeric media, wherein at least first and second filters of the two to eight filter units flow liquid into and out of the first and second filters into the discharge line when the plurality of valves are in a first position, and wherein the first and second filters flow liquid into and out of the first filter into the discharge line and further flow from the discharge line into the outlet and out of the inlet of the second filter and into the backwash line when the plurality of valves are in a second position to backwash the second filter such that the second filter backwashes with only filtered liquid from the discharge line.

8. The method of claim 7, wherein a plurality of filter units is used simultaneously.

9. The method of claim 7, wherein filter media in a first filter unit is the same as filter media in a second filter unit.

10. The method of claim 7, wherein a first filter unit comprises a first filter media and a second filter unit comprises a second filter media.

11. The portable filter system according to claim 1, wherein at least one filter unit comprises a first and second chamber, the first chamber in fluid communication with the second chamber, the first chamber having a slanted plate in fluid communication with at least one inlet, and wherein the first chamber is positioned above the second chamber.

12. The portable filter system of claim 11, wherein the second chamber contains filtration media.

13. The portable filter system to claim 1, wherein at least two of the filter units each comprise a first and second chamber, the first chamber in fluid communication with the second chamber, and the first chamber having a slanted plate in fluid communication with at least one inlet.

14. The portable filter system of claim 13, wherein the second chamber contains filtration media.

15. The portable filter system of claim 14, wherein an upper slanted plate slants into the first chamber at an angle of from 110° to 125°, and wherein the first chamber further comprises a lower slanted plate in fluid communication with the second chamber, and wherein the lower slanted plate slants from a vertical supporting wall to an interior wall of the first chamber at an angle of from 45° to 70°.

16. The method of claim 7, wherein the at least one filter unit includes a first chamber positioned generally above a second chamber, wherein liquid flowing in via the at least one inlet is provided into the first chamber forming a vortex in the first chamber of the at least one filter unit.

17. The method of claim 16, wherein the first chamber includes a first slanted plate in fluid communication with at least one inlet and a second slanted plate in fluid communication with the second chamber.

18. The method of claim 17, wherein the second chamber contains filtration media.

19. The method of claim 18, wherein at least two of the filter units each comprise separate first and second chambers, the first chambers in fluid communication with the second chambers, both first chambers having a slanted plate in fluid communication with at least one inlet and both second chambers containing filtration media.

* * * * *